United States Patent
Yang et al.

(10) Patent No.: US 7,559,055 B2
(45) Date of Patent: Jul. 7, 2009

(54) CONTROLLING COLLECTION OF DEBUGGING DATA

(75) Inventors: Lianghua Yang, Kitchener (CA); Darcy Phipps, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 25 days.

(21) Appl. No.: 11/152,165

(22) Filed: Jun. 15, 2005

(65) Prior Publication Data

US 2007/0006154 A1    Jan. 4, 2007

(51) Int. Cl.
G06F 9/44    (2006.01)

(52) U.S. Cl. .......................... 717/127; 717/124; 714/38

(58) Field of Classification Search ................ 717/124, 717/126, 127; 709/201, 208, 217, 224, 231, 709/232

See application file for complete search history.

(56) References Cited

U.S. PATENT DOCUMENTS

| | | | | |
|---|---|---|---|---|
| 5,446,878 | A | * | 8/1995 | Royal .............................. 714/1 |
| 5,630,049 | A | * | 5/1997 | Cardoza et al. ................ 714/25 |
| 5,771,385 | A | * | 6/1998 | Harper ......................... 717/128 |
| 6,253,368 | B1 | * | 6/2001 | Nelin et al. ................... 717/124 |
| 6,470,388 | B1 | * | 10/2002 | Niemi et al. .................. 709/224 |
| 6,871,228 | B2 | * | 3/2005 | Shah et al. .................... 709/224 |
| 7,047,521 | B2 | * | 5/2006 | Bunnell ........................ 717/130 |
| 7,120,685 | B2 | * | 10/2006 | Ullmann et al. .............. 709/224 |
| 7,120,901 | B2 | * | 10/2006 | Ferri et al. ................... 717/128 |
| 7,284,238 | B2 | * | 10/2007 | Inagaki et al. ................ 717/128 |
| 2004/0087303 | A1 | | 5/2004 | Pugliese |
| 2004/0143641 | A1 | | 7/2004 | De Jong |
| 2004/0225920 | A1 | * | 11/2004 | Bates et al. ..................... 714/38 |
| 2004/0250164 | A1 | | 12/2004 | Ahmad et al. |
| 2005/0022169 | A1 | * | 1/2005 | Perlin et al. .................. 717/124 |
| 2005/0132337 | A1 | * | 6/2005 | Wedel et al. ................. 717/128 |
| 2005/0193036 | A1 | * | 9/2005 | Phillips et al. ............... 707/202 |
| 2006/0117091 | A1 | * | 6/2006 | Justin .......................... 709/217 |
| 2006/0229064 | A1 | * | 10/2006 | Pitkamaki et al. ......... 455/414.3 |

OTHER PUBLICATIONS

Veritas Software, "How to enable or disable "debug logging" in Veritas Backup Exec (tm) 9.x on Windows NT 4.0, Windows 2000, Windows XP and Windows 2003 platforms", retrieved Jan. 14, 2005 from HTTP://seer.support.veritas.com/docs/254212.htm.

* cited by examiner

Primary Examiner—Lewis A Bullock, Jr.
Assistant Examiner—Jue S Wang

(57) ABSTRACT

By altering existing code to wrap debugging items with runtime conditional statements, the debugging items may remain in commercial builds of code. Execution of a given conditional statement, wrapping a particular debugging item, may require a read of a particular location in an expandable and organized table such that execution of the particular debugging item is dependent on the value stored in the particular location in the table. By storing appropriate values in the table, a very focused debugging operation may be carried out. When implemented on a mobile communication device, such a focused debugging operation may be considered to conserve limited memory resources and reduce radio costs when compared to an unfocused debugging operation, which can create a large log file that is difficult to store and expensive to transmit.

11 Claims, 9 Drawing Sheets

CONTROLLING COLLECTION OF DEBUGGING DATA

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present application relates to troubleshooting of software code and, more particularly, controlling collection of debugging data for such software code.

BACKGROUND

Mobile communication devices, such as cellular phones and personal digital assistants (PDAs) with wireless communication capabilities, may be considered to be complex combinations of hardware, firmware and software. It is typical that such devices are developed according to established standards to promote use on networks provided by disparate service providers. It is also typical that mobile device firmware and software have many issues that need to be resolved while being developed. As such, development of mobile device firmware and software may be organized as a development cycle that includes an engineering build, a beta build and a commercial build. The act of debugging software often involves inserting debugging items in the code. Such debugging items often simply write some informative data to a log to indicate that execution of the code took a particular branch, perhaps additionally writing to the log a current value of one or more variables associated with the informative data to report the events/procedures of embedded processing and radio processing. Often debugging items are associated with condition judgments such that writing to the log is performed only when a certain condition is met. Typically, many debugging items are part of the engineering build of the operating system software for a mobile device. Later, fewer debugging items are built into the beta build. For reasons that will become clear hereinafter, the commercial build typically includes no debugging items. Decisions regarding how many debugging items to include in the code, and which debugging items to include in the code, are typically made at different times, while the operating system software is coded by different developers for various software modules, i.e., before the software is compiled. As such, only those debugging items included in the code after compiling and linking may write to the log. Clearly, further debugging items may not be added after the operating system software is compiled.

Even after a long development cycle, problems may still be encountered once a device is in use by an end user in a real-world situation. When such problems are reported, a mobile device manufacturer may send Inter-Operability Testing (IOT) specialists to the region of the end user that has reported the problem. The IOT specialists then attempt to duplicate the reported problem on an equivalent mobile device, which is connected via USB or serial bus to a log-collecting-software-loaded computer, running an engineering build of the operating system software, while the built-in debugging items record, in a log, various actions of the mobile device. The execution of the debugging items may be considered to assist "Runtime Troubleshooting". The log may then be analyzed to learn the procedures that were executing at the time of the problem and other context information that may allow an IOT specialist to determine the source of the problem. Unfortunately, the extensive travel required by the sending of IOT specialists to duplicate every reported problem can be expensive. Additionally, it is not always possible to duplicate the reported problem, in part because the engineering build and the commercial build of the software may differ; and in part due to a fluctuating radio environment and different particular user operations with various procedure contexts.

Although it may be considered useful to have each device continuously generate debugging data, simply including all debugging items in the commercial build of the operating system software may lead to internal buffers overflowing with debugging data to which an IOT specialist may never refer. Without connection to a local computer for instant and dynamic debugging data flushing, such internal buffer overflow may happen in a time that may as short as to be measured in milliseconds and may cause the truly valuable logging data to be shifted out and overwritten by unrelated logging data. Due to the latency of multi-threading, the time gap between the triggering event and actual data log retrieval is often long enough that the original debugging data may be lost. Clearly, a system should be put in place to control the collection of the debugging data.

BRIEF DESCRIPTION OF THE DRAWINGS

In the figures which illustrate example embodiments of this application.

DETAILED DESCRIPTION

Figure 1:
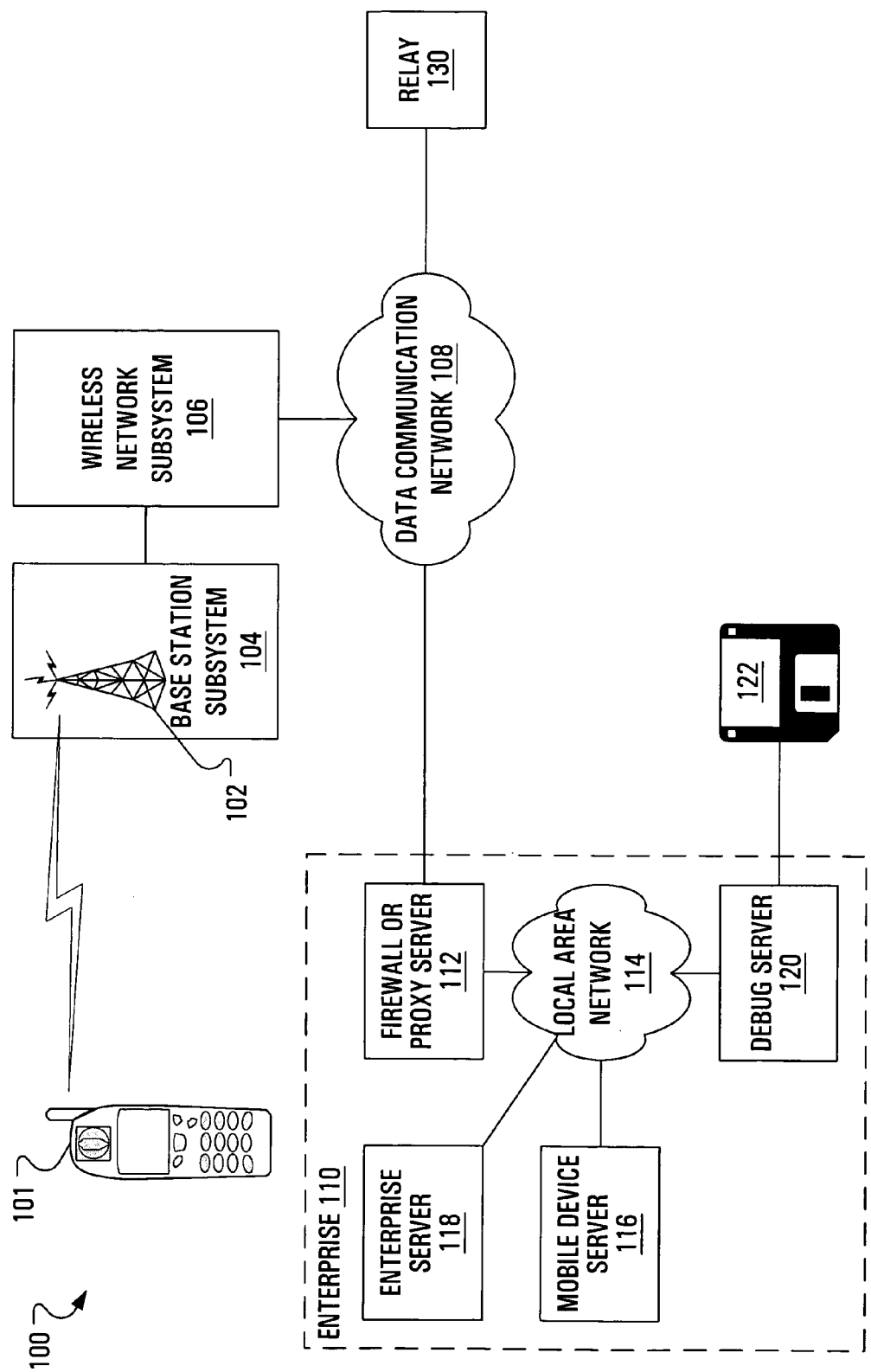
FIG. 1 illustrates elements of an exemplary network environment for a wireless mobile communication device.

Software code may be programmed to include a plurality of runtime debugging items in addition to implementing product functionalities. When an organized and consolidated table is included in a device executing the code, with individual locations in the table corresponding to all debugging items, the runtime debugging items may be wrapped by conditional code that references corresponding locations in the table.

Thus, a given debugging item may only be executed if the corresponding location in the table is determined to have a predetermined value. Advantageously, runtime troubleshooting may be selective and such runtime troubleshooting may have a particular focus even in a post-production period. A debug server may maintain a copy of the table such that a debugging control command may be generated at the debug server to alter the value stored at a selected location in the table inside a targeted device and, thereby, enable or disable selected ones of the debugging items. Once generated, the debugging control command may be transmitted to the targeted device at which the debugging code execution may be activated or deactivated according to the debugging control command. Furthermore, when code is updated or additional code is available for execution on the device, new debugging items may be introduced with corresponding conditional code referencing new values stored in the table, thereby providing backward and forward compatibility. The tables at the device and at the debug server may be updated to include the new locations with corresponding values.

In accordance with an aspect of the present application there is provided a method of controlling selective collection of debugging data at a mobile communication device. The method includes receiving, from a source, a command to activate a debugging item and, conditional upon the receiving, while executing code at the mobile, on encountering the debugging item, executing the debugging item.

In accordance with another aspect of the present application there is provided a client/server style, end-to-end system for controlling collection of debugging data. The system includes a debug server and a mobile communication device. The debug server is adapted to generate a command to activate a debugging item and transmit the command. The mobile communication device is adapted to receive, from the debug server, the command to activate the debugging item and, conditional upon the receiving, while executing code at the mobile, on encountering the debugging item, execute the debugging item.

In accordance with still another aspect of the present application there is provided, at a debug server, a method of controlling collection of debugging data at a mobile communication device. The method includes receiving an indication of a status indicator to control, generating a command protocol data unit to cause an altering of a value of the status indicator at the mobile communication device, where the command protocol data unit includes a reference to the status indicator and an indication of a manner in which the status indicator is to be altered and transmitting the protocol data unit to the mobile communication device. In other aspects of the application, an apparatus is provided, with a processor adapted to perform this method, and a computer readable medium is provided to adapt the apparatus to perform this method.

In accordance with a further aspect of the present application there is provided, at a mobile communication device, a method of controlling collection of debugging data. The method includes receiving, from a source, a command protocol data unit that includes a control command and a reference to a location in a table, according to the control command, altering the value stored at the location in the table, while executing code, reading the location in the table and, based on the value stored at the location in the table, executing a debugging item.

In accordance with a still further aspect of the present application there is provided computer readable medium containing computer-executable instructions that, when performed by processor, cause the processor to, while executing code, read a location in a table and, based on a value stored at the location in the table, execute a debugging item.

Other aspects and features of the present application will become apparent to those of ordinary skill in the art upon review of the following description of specific embodiments of the application in conjunction with the accompanying figures.

FIG. 1 illustrates elements of an exemplary network environment 100 for a wireless mobile communication device 101. The elements of the exemplary network environment 100 include a wireless carrier core network subsystem 106 and a data communication network 108, which may be considered to represent at least one wide area network, such as the present day Internet and successors, as well as, potentially, multiple local area networks. A base station antenna 102, with which the mobile device 101 may communicate wirelessly, is provided as part of a base station subsystem 104.

The base station subsystem 104 communicates with the wireless core network subsystem 106. In an exemplary Global System for Mobile communications (GSM) implementation, the wireless core network subsystem 106 includes, among other components, a mobile services switching center, a home location register, a visitor location register and a Short Messaging Service Center. As illustrated in FIG. 1, the wireless core network subsystem 106 is connected to the data communication network 108.

The mobile device 101 may be associated with an enterprise 110 in communication with the data communication network 108. The enterprise 110 may, for instance, include a firewall or proxy server 112 connecting to the data communication network 108 and to a local area network (LAN) 114. The LAN 114 may allow communication between a mobile device server 116, an enterprise server 118 and a debug server 120 within the enterprise. Notably, the debug server 120 is unique to aspects of the present application.

The debug server 120 may be loaded with computer readable instructions for executing methods exemplary of this application from a software medium 122 which could be a disk, a tape, a chip, a flash memory card or a random access memory containing a file downloaded from a remote source.

Also connected to the data communication network 108 may be a relay 130.

Figure 2:
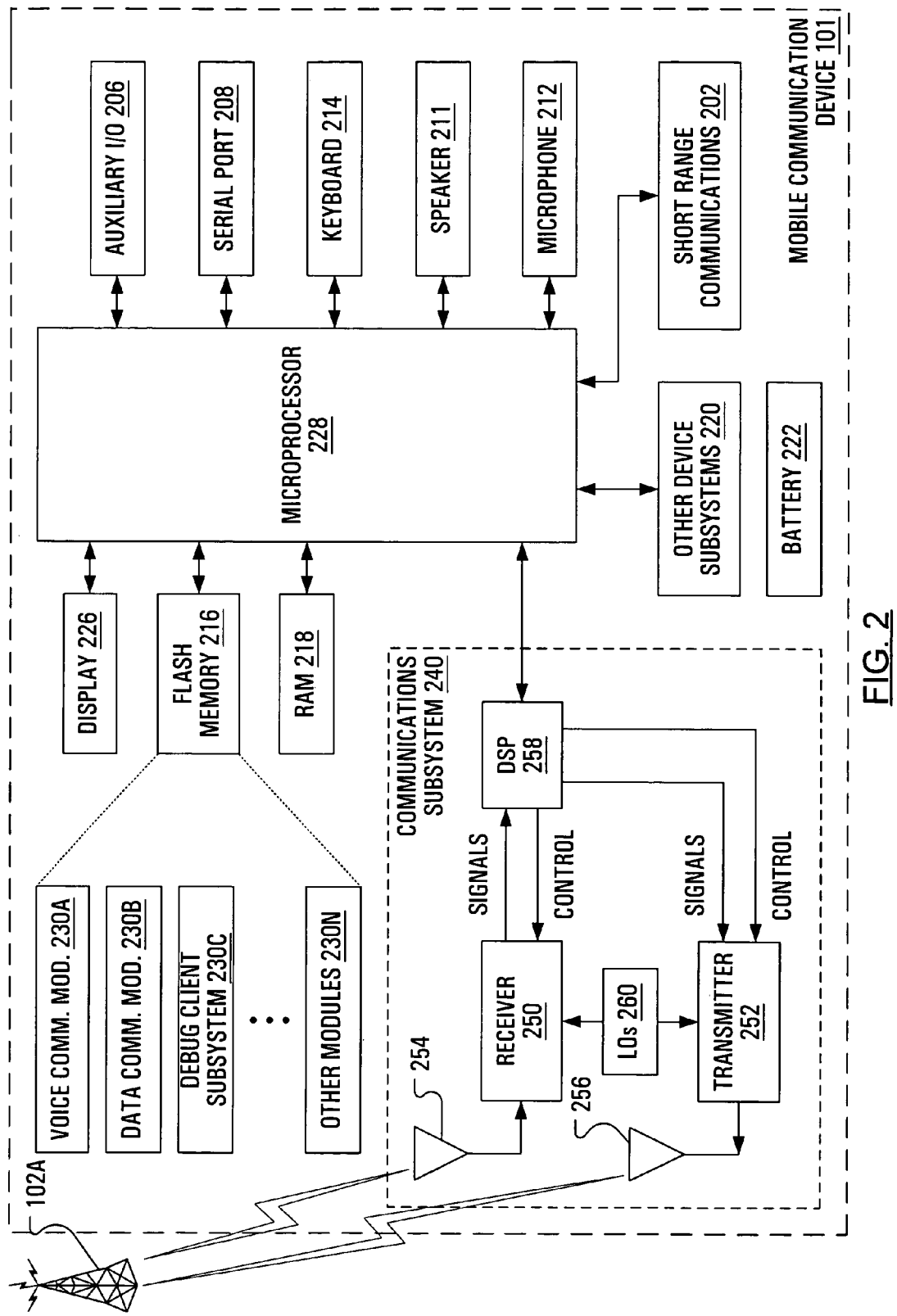
FIG. 2 illustrates, in greater detail, the wireless mobile communication device of FIG. 1 according to an embodiment of the present application.

FIG. 2 illustrates the wireless mobile device 101 including a housing, an input device (a keyboard 214), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 214 and the display 226. The microprocessor 228 controls the operation of the display 226, as well as the overall operation of the mobile device 101, in response to actuation of keys on the keyboard 214 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the mobile device 101 are shown schematically in FIG. 2. These include: a communications subsystem 240; a short-range communications subsystem 202; the keyboard 214 and the display 226, along with other input/output devices including a set of auxiliary I/O devices 206, a serial port 208, a speaker 211 and a microphone 212; as well as memory devices including a flash memory 216 and a Random Access Memory (RAM) 218; a battery 222; and various other device subsystems 220. The mobile device 101 is preferably a two-way radio frequency (RF) communication device having voice and data communication capabilities. In addition, the mobile device 101 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device 101 may also be stored to the RAM 218.

The microprocessor 228, in addition to its operating system functions, enables execution of software applications on the mobile device 101. A predetermined set of software applications that control basic device operations, such as a voice communications module 230A and a data communications module 230B, may be installed on the mobile device 101 during manufacture. A debug client subsystem 230C may also be installed on the mobile device 101 during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the base station antenna 102. Preferably, the data items managed by the PIM application are seamlessly integrated, synchronized and updated via the wireless carrier network with the mobile device 101 user's corresponding data items stored or associated with a host computer system.

Communication functions, including data and voice communications, may be performed through the communication subsystem 240 and, possibly, through the short-range communications subsystem 202. The communication subsystem 240 includes a receiver 250, a transmitter 252 and one or more antennas, illustrated as a receive antenna 254 and a transmit antenna 256. In addition, the communication subsystem 240 also includes a processing module, such as a digital signal processor (DSP) 258, and local oscillators (LOs) 260. The specific design and implementation of the communication subsystem 240 is dependent upon the communication network in which the mobile device 101 is intended to operate. For example, the communication subsystem 240 of the mobile device 101 may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), GSM, etc. Other types of data and voice networks, both separate and integrated, may also be utilized with the mobile device 101.

When the required network registration or activation procedures have been completed, the mobile device 101 may send and receive communication signals over the wireless carrier network. Signals received from the base station antenna 102 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102 are processed (e.g., modulated and encoded) by the DSP 258 and are then provided to the transmitter 252 for digital to analog conversion, frequency up conversion, filtering, amplification and transmission to the base station antenna 102 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 240 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 214 and/or some other auxiliary I/O device 206, such as a touchpad, a rocker switch, a thumb-wheel, or some other type of input device. The composed data items may then be transmitted to the base station antenna 102 via the communication subsystem 240.

In a voice communication mode, overall operation of the mobile device 101 is substantially similar to the data communication mode, except that received signals may be output to the speaker 211, and signals for transmission may be generated by the microphone 212. Alternative voice or audio I/O subsystems, such as a voice message recording subsystem, may also be implemented on the mobile device 101. In addition, the display 226 may also be utilized in voice communication mode, for example, to display the identity of a calling party, the duration of a voice call, or other voice call related information.

The short-range communications subsystem 202 enables communication between the mobile device 101 and other proximate systems or devices, which need not necessarily be similar devices. For example, the short-range communications subsystem 202 may include an infrared device and associated circuits and components, or a Bluetooth™ communication module, to provide for communication with similarly-enabled systems and devices.

Figure 3:
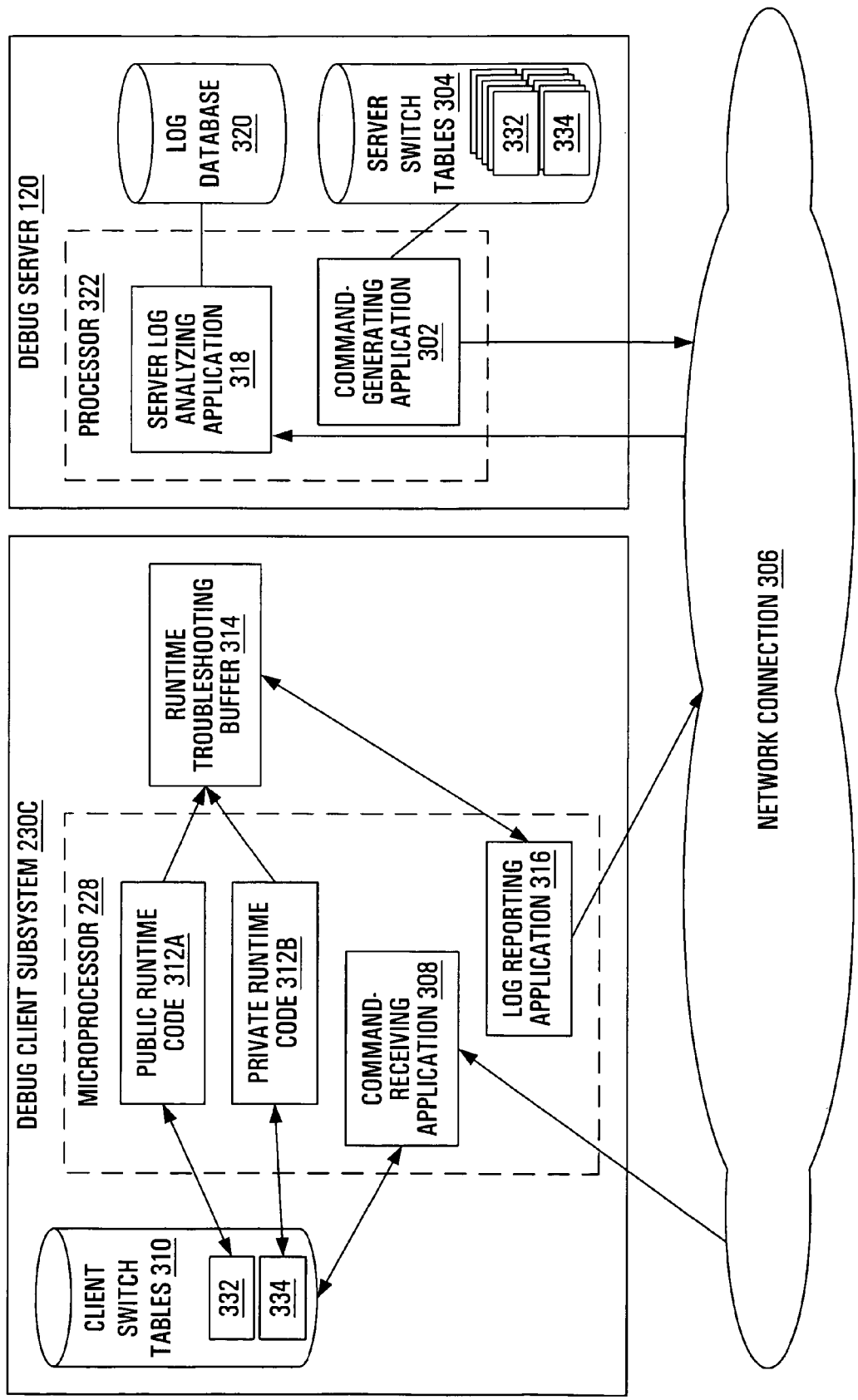
FIG. 3 illustrates logical elements required for operation of aspects of the application.

FIG. 3 illustrates both physical and logical elements involved in operation of aspects of the application. In particular, physical and logical elements of the debug server 120 of the enterprise 110 of FIG. 1 are illustrated alongside physical and logical elements of the debug client subsystem 230C of the mobile device 101, whose detail is illustrated in FIG. 2.

The physical and logical elements of the debug server 120 include a command generating application 302 that, while executing on a debug server processor 322, has access to a centralized server switch table database 304. The debug server 120 also includes a server log analyzing application 318 that, while executing on the debug server processor 322, has access to read from, and write to, a log database 320.

The debug client subsystem 230C is illustrated as including a command receiving application 308, execution of which results in the microprocessor 228 accessing a centralized client switch table database 310 specific to the mobile device 101. The centralized client switch table database 310 may be also accessed by the microprocessor 228 while executing public runtime code 312A and private runtime code 312B.

Execution of the runtime code 312A, 312B at the microprocessor 228 may involve execution of selected public debugging items and selected private debugging items.

A reference, in a switch table database, to a debugging item may be called a control status indicator. The value of the control status indicator may be used to indicate whether a corresponding debugging item, or a corresponding set of debugging items, is to be considered activated or deactivated. So that centralized control of runtime debugging may be maintained at the mobile device 101, the client switch table database 310 may be arranged to contain control status indicators corresponding to all available public debugging items and private debugging items. The control status indicators may be referenced by the public runtime code 312A and the private runtime code 312B. The result of the execution of the selected debugging items may be stored in a circular runtime troubleshooting buffer 314. The circular runtime troubleshooting buffer 314 may be accessed by a log reporting application 316.

The circular runtime troubleshooting buffer 314 may be implemented as part of a common buffer already existing on the mobile device 101 or may be implemented as a buffer that is separate from the preexisting common buffer and may be dedicated to the tasks of being written to by debugging items in the public runtime code 312A and in the private runtime code 312B and being accessed by the log reporting application 316.

The debug client subsystem 230C is illustrated as directly connected to the debug server 120 by an end-to-end network connection 306, although the debug client subsystem 230C is more accurately connected to the end-to-end network connection 306 by way of the communication subsystem 240 (FIG. 2).

The end-to-end network connection 306 may be understood to include wireless connections between the mobile device 101 and the base station subsystem 104, as well as connections from the base station subsystem 104 to the wireless core network subsystem 106, from the wireless network core subsystem 106 to the data communication network 108, between the data communication network 108 and the relay 130, between the data communication network 108 and the firewall 112, between the firewall 112 and the LAN 114 and between the LAN 114 and the mobile device server 118.

The client switch table database 310, of the mobile device 101, is illustrated as including two debug sub-tables: a non-privacy-related public debug sub-table 332; and a privacy-related private debug sub-table 334. In particular, the public debug sub-table 332 may include only control status indicators corresponding to the debugging items that are related to general information, such as power consumption data, deadlock, LCD reset, without any references to the debugging items that are related to end-user privacy information. In contrast, the private debug sub-table 334 may include only control status indicators corresponding to debugging items related to end-user privacy information, such as location information, caller phone number, called phone number, etc.

The centralized server switch table database 304, of the debug server 120, is illustrated as having a plurality of debugging item sub-tables; a pair of debugging item sub-tables for each device model, or for each version of a device model, if the device model has several versions. "Model" and/or "version" may be used as a database key to reference the debugging item sub-tables in the centralized server switch table database 304 that correspond to a specific registered device. The public debug sub-table 332 and the private debug sub-table 334, for the mobile device 101, are illustrated among the debugging item sub-tables at the centralized server switch table database 304.

In overview, a basic, embedded-system, debugging solution is enabled by aspects of the application. Before compile time, a plurality of runtime debugging items may be programmed into operational code for the mobile device 101 wrapped by conditional statements. Control status indicators that correspond to the various debugging items may be maintained debug sub-tables in the centralized client switch table database 310 for the mobile device 101, as well as corresponding debug sub-tables in the centralized server switch table database 304, among debug sub-tables for all models and/or versions of mobile devices. While deployed, the mobile device 101 may receive a debugging control command protocol data unit (PDU), over a wireless communication channel, from the debug server 120, to control (enable/disable) a specific control status indicator. The specific control status indicator may be associated with a unique control status identifier (CSID) for one-to-one mapping and identification. Upon receipt of the debugging control command PDU, the command receiving application 308 may determine a location within the centralized client switch table database 310 for the control status indicator referenced by the CSID in the debugging control command PDU. If, for instance, the debugging control command PDU causes a given control status indicator to be enabled, execution of a debugging item that is wrapped by conditional code that references the given control status indicator may generate output that is written to the circular runtime troubleshooting buffer 314.

Periodically, the contents of the circular runtime troubleshooting buffer 314 may be transmitted to the debug server 120 over a communication channel and may be saved by the debug server 120 as a model-version-specific log item in the log database 320 for further analysis. Such log items with selected focus and accurate information as much as possible may be automatically analyzed using the log analyzing application 318 and may thereby save significant traveling cost and technical effort. In certain cases, some of these log items may be manually processed and emailed to mobile device firmware and operating software developers for thorough, in-depth debugging.

In other aspects of the application, transmission of the contents of the circular runtime troubleshooting buffer 314 to the debug server 120 may be triggered by wireless/embedded events. Such events are considered by the applicant to be implementation specific. Additionally, transmission of the contents of the circular runtime troubleshooting buffer 314 to the debug server 120 may be triggered by the receipt of a demand from the debug server 120. Further, transmission of the contents of the circular runtime troubleshooting buffer 314 may be triggered by the receipt of a request. The request may be generated through interaction between a user interface and an end-user of the mobile device 101. The user interface may be provided by a mobile-side application such as the log reporting application 316. Alternatively, the request may be generated by an application on a personal computer with a local connection to the mobile device 101. The local connection may be wired or wireless.

In operation, the debugging items corresponding to the control status indicators in the public debug sub-table 332 of the client switch table database 310 at the mobile device 101 may be controlled (activated/deactivated) in three ways: a) remotely controlled, without alerting the end-user of the mobile device 101, by the debug server 120 using methods exemplified in aspects of this application; b) controlled by a debugging application executed on a Personal Computer locally connected to the mobile device 101, which is similar to known cases of developer or test engineer debugging control; C) locally controlled by a debugging application executed on the mobile device 101, which may be merged with the command receiving application 308.

The debugging items corresponding to the control status indicators in the private debug table 334 of the client switch table database 310 may be controlled in at least two ways: controlled by a debugging application executed on a Personal Computer locally connected to the mobile device 101; or locally controlled by a debugging application executed on the mobile device 101.

In contrast to the case of controlling the debugging items corresponding to the control status indicators in the public debug sub-table 332, the debugging items corresponding to the control status indicators in the private debug sub-table 334 of the client switch table database 310 may be remotely controlled by the debug server 120, using methods exemplified in aspects of this application, only after the end-user of the mobile device 101 has been alerted by a user interface and the end-user has accepted/confirmed the control command. Such a scenario may be useful if, for instance, a mobile vendor has a requirement to control beta test devices.

It is known that at least two kinds of exemplary debugging items may be described with C language pseudo code and inserted in mobile device operational code as follows:

```
#ifdef RIM_DEBUG_ENABLE_GSM_SIGNALLING_DEDICATED
        PRINTN("No/Bad downlink sacch received:RLTC=%2d",
              radioLinkFailCounter);
#endif    //case A
    PRINTN( ) is a function to log data into a buffer.
    "No/Bad downlink sacch received:RLTC=%2d" is a string format.
    "radioLinkFailCounter" is a variable defined in the device code.
    "#ifdef ... #endif" are conditional compiling macro.
    "RIM_DEBUG_ENABLE_GSM_SIGNALLING_DEDICATED"
    is an individual developer/team defined macro to
    control/configure the build at compiling time.
```

The above first exemplary debugging item has a drawback in that when the debugging item is no longer required, such as when a solution has been found to the problem that the first exemplary debugging item was designed to help solve, the software code is generally revised to remove the first exemplary debugging item and a new executable is built from the revised software code. Subsequently, the first exemplary debugging item may be required, say, to debug a new problem. In which case, the software code is revised to include the first exemplary debugging item and a new executable is built from the revised software code. Unfortunately, repeatedly rebuilding software code costs time and the reload of the new executable is only available to devices associated with developers, beta testers and a very few special customers. Many other costs, such as those related to travel and development cycle duration are associated with this solution, which may be called a "compiling time" solution.

```
if (gprsBlockDbgOn == true) {
        ShowGsmBlockInt (block23, fileline, l1FrameNumber);
}     // case B
    "gprsBlockDbgOn" is a runtime debug-control variable defined by
    individual developers/teams.
    "ShowGsmBlockInt( )" is a debug function called at runtime only
    upon gsmBlockDbgOn condition to log data into a buffer.
    "block23", "fileline", "l1FrameNumber" are the
    variables in device code.
```

The use of runtime debug-control variables, such as in the above second exemplary debugging item, has a drawback in that so many different, separately-defined, runtime debug-control variables may be programmed into radio processing code, embedded processing code and wireless application code that the full set of runtime debug-control variables may be extremely difficult to maintain. Unfortunately, when developers are limited to the runtime debug-control variables that have been included in software code before the code is built to form an executable, capturing potential new problems may be difficult, separately defined runtime debug-control variables may have overlapping controls, maintaining the device code and configuring all variables to select the required debug data may be considered extremely difficult and unnecessary runtime debug-control variables may be seen to waste valuable buffer resources.

In an aspect of the application, a conditional statement, or "wrapping code", may be written into the operational code in a manner that combines centralized-control-capable runtime debugging, object oriented programming (OOP) and wireless over-the-air (OTA) client/server control to wrap the debugging item as follows:

```
if (GenericDbgObj.xxxGroup.xxxItem == 1) {
        PRINTN("No/Bad downlink sacch received:RLTC=%2d",
              radioLinkFailCounter);
} // case A improvement
    "GenericDbgObj" is the "public debug sub-table" 332 part of the
    client switch table database 310 and, correspondingly, of the server
    switch table database 304 as described above, and is an OOP-style
    variable (i.e., an object) of structure "GenericDbgObj_t"
    as defined later in pseudo code.
    "xxxGroup" is an element of GenericDbgObj that
    may be used to organize the debugging items with close
    interlinks into a certain group, like the "moCallGroup"
    of "GenericDbgObj_t".
    "xxxItem" is an element of xxxGroup that may be used to singlely
    control a runtime debugging item, several exemples are included in
    the following, including the "establish" control status bit of the
    "moCallGroup" group of the GenericDbgObj_t" object.
if(PrivateDbgObj.xxxGroup.xxxItem == true) {
        ShowGsmBlockInt(block23, fileline, l1FrameNumber);
}    // case B improvement
    "PrivateDbgObj" is the "Private debug sub-table" 334 part of
    client switch table database 310 and, correspondingly, of the server
    switch table database 304 as described above, and is an OOP-style
    variable (i.e., an object) of structure "PrivateDbgObj_t"
    as defined later in pseudo code.
    "xxxGroup" is an element of PrivateDbgObj.
    "xxxItem" is an element of xxxGroup that may be used to singlely
    control a runtime debugging item, several exemples are included in
    the following, including the "mysite" control status bit of the
    "locationGroup" group of the "PrivateDbgObj_t" object.
```

The case B improvement immediately above may be considered very similar to the case A improvement further above, with the difference being that the private debug sub-table 334 is used in the case B improvement, where the public debug sub-table 332 was used in the case A improvement.

In view of the above, it should be clear that advantages like backward/forward compatibility and one-time only debugging code maintenance can be achieved using object oriented programming in conjunction with such centralized debug control tables as have been described as populating the exemplary switch table databases 304, 310. Using an end-to-end, remote client/server debugging system such as presented in aspects of this application, runtime debugging power may be leveraged to capture focused information for known problems at various physical locations within different wireless networks, even for many new potential problems of new technology-integrated networks (like 3G, 4G, wireless WAN with wireless LAN). To build pure runtime debugging into mobile devices is encouraged as is having as many debugging capabilities as possible built-in for mobile devices with complex wireless/embedded processing and various technologies.

Figure 4:
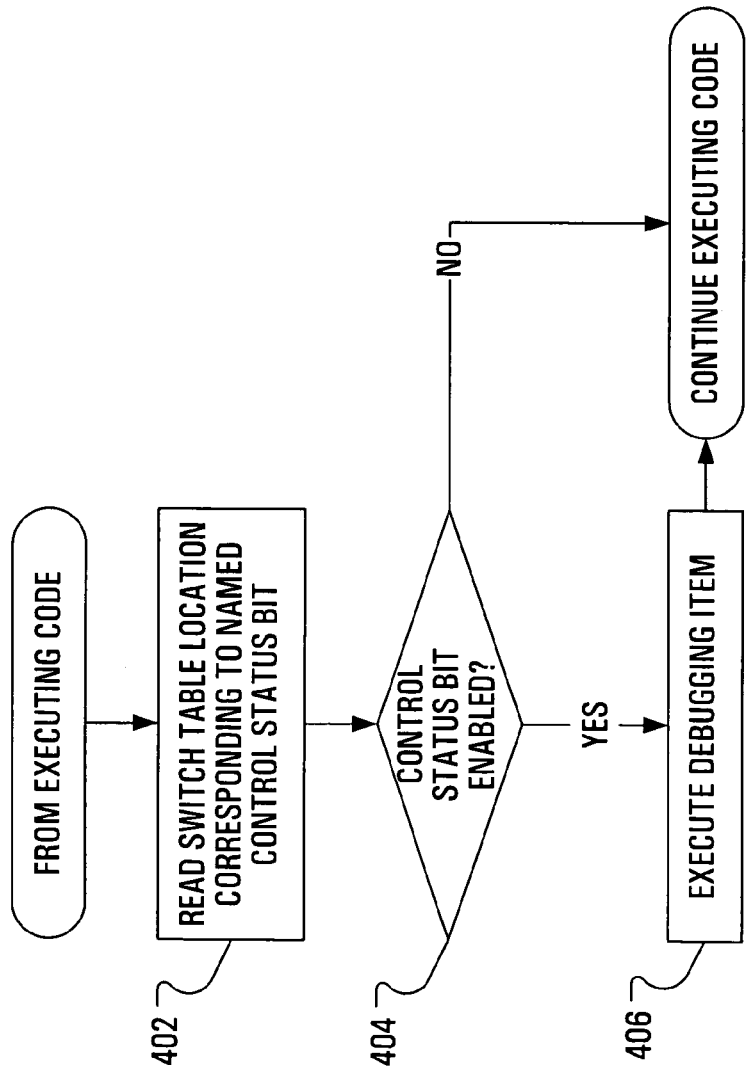
FIG. 4 illustrates steps in an exemplary method of debugging data collection according to an embodiment of the present application.

As shown in exemplary steps of a method presented in FIG. 4, while executing code, the microprocessor 228 may be caused to evaluate a conditional statement, which references a control status indicator, to determine whether to execute a given debugging item. In the exemplary system discussed herein, the control status indicator is a single bit, although it should be clear that, where control more complex than binary control (enable/disable) is required, the control status indicator may be designed to suit the situation. The conditional statement may cause the microprocessor 228 to read the control status bit from a location in the centralized client switch table database 310 (step 402). In an exemplary case, if it is determined (step 404) that the referenced control status bit is enabled (e.g., set to "1"), the given debugging item is executed (step 406). If it is determined (step 404) that the control status bit is disabled (e.g., set to "0"), the exemplary debugging item is not executed and the microprocessor 228 may continue executing the code. Clearly, the opposite interpretation of the bit values is also possible, i.e., a "0" meaning enabled and a "1" meaning disabled.

To facilitate organization of the control status bits in the centralized switch table databases 304, 310, the control status bits may be organized into two-byte (16-bit) values. Furthermore, the values may be organized such that each two-byte value corresponds to a group of control status bits that all relate to a common aspect of operation of the code or the mobile device 101.

Figure 5:
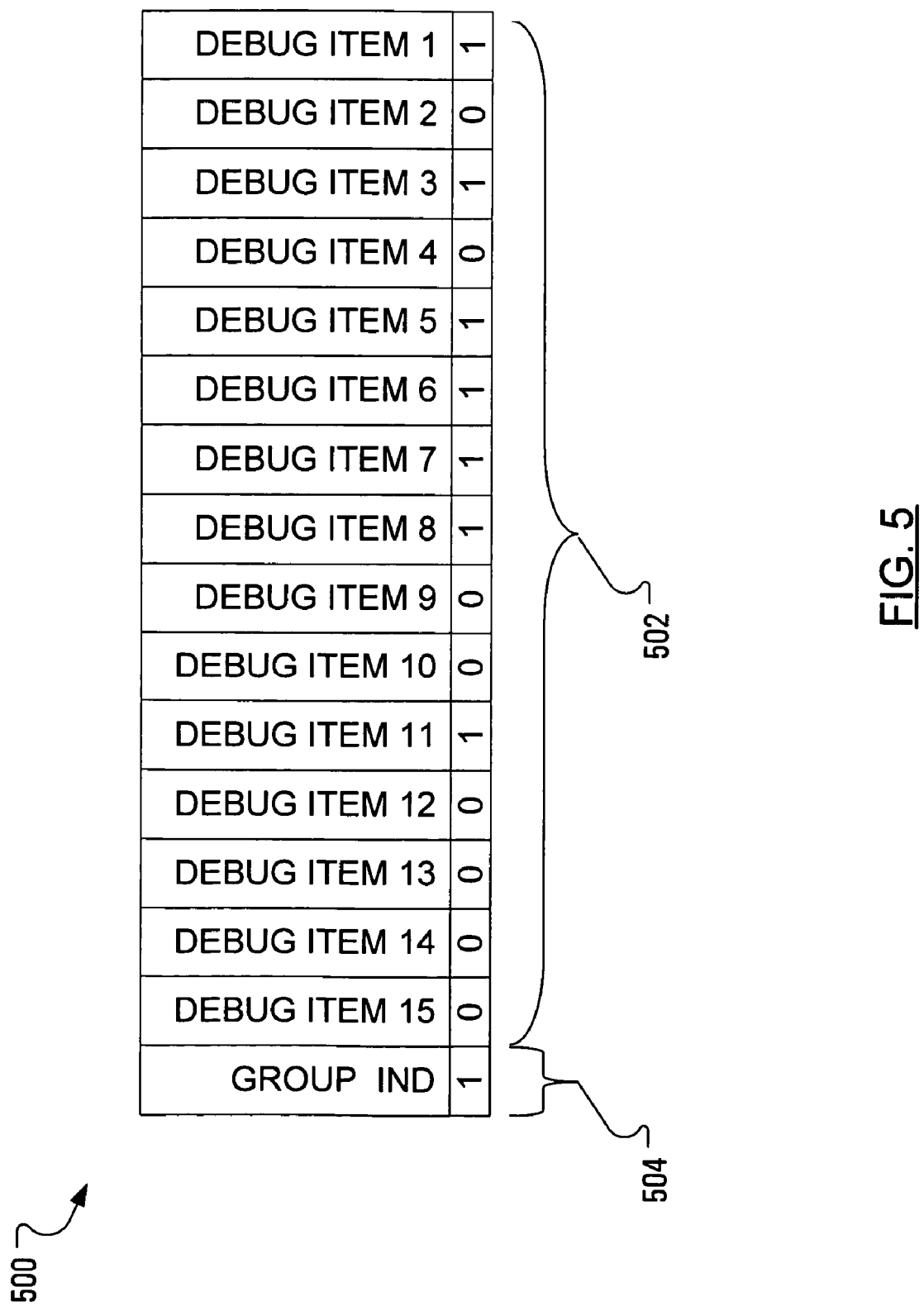
FIG. 5 illustrates a portion of a switch table for a generic group of debugging items according to an embodiment of the present application.

FIG. 5 illustrates a structure for an exemplary two-byte representation 500. As illustrated, the exemplary two-byte representation 500 includes 15 control status bits 502 and a group-control status bit 504 for the whole group. Notably, the size (in bits) of the values that represent groups of control bits is a design consideration and may be set as 8 or 32 (or any other number), rather than 16, if there are perceived advantages.

Using generic software engineering notation, an exemplary group called "moCallGroup" may be defined in C programming language with the pseudo code as follows:

```
Typedef struct {
        Int16    lcdGroup;    // integer style
        union {    // union, struct style
            Int16 mogrpVar;
            struct {
               Int16    establish :1;
               Int16    vocoerrate :1;
               Int16    chandesc :1;
               Int16    release :1;
               Int16    reserved :11;
               Int16    grpctrl :1;
            } mogrpBitmap;
        }moCallGroup;
        // other public debug groups appended like above
        Boolean    objWholeCtrl;    // (de)activate all items
                                    // in this object
} GenericDbgObj_t;  //for public debug sub-table, debugging items,
debug runtime code
GenericDbgObj_t        GenericDbjObj;
Typedef struct {
        Int16    phoneNumberGroup;    // integer style
        union {    // union, struct style
            Int16 locgrpVar;
            struct {
```

```
               Int16    mysite :1;
               Int16    peersite :1;
               Int16    updatecycle :1;
               Int16    datatime :1;
               Int16    reserved :11;
               Int16    grpctrl :1;
            } locationgrpBitmap;
        }locationGroup;
        // other private debug groups appended like above
        Boolean    objWholeCtrl;    // (de)activate all items
                                    // in this object
} PrivateDbgObj_t;    //for private debug sub-table, debugging
items, debug runtime code
PrivateDbgObj_t        PrivateDbjObj;
```

In view of the above, it should be clear that advantages such as backward/forward compatibility and scalable debug table organization with OOP can be achieved using the following policies when maintaining the switch tables: 1) each device model and/or version has a unique client switch table, stored, for instance, in the client switch table database 310, and a corresponding server switch table, stored, for instance, in the server switch table database 304; 2) any already-defined control status bit positions for existing debugging items or groups may not be deleted, relocated, changed or re-sorted; 3) control status bit positions for a new group are preferably appended at the end of a given switch table, rather than inserted into the given switch table elsewhere; 4) a control status bit for a new debugging item may either be defined in a reusable reserved item of an existing group, or may be created in a group newly appended to a given table.

Figure 6:
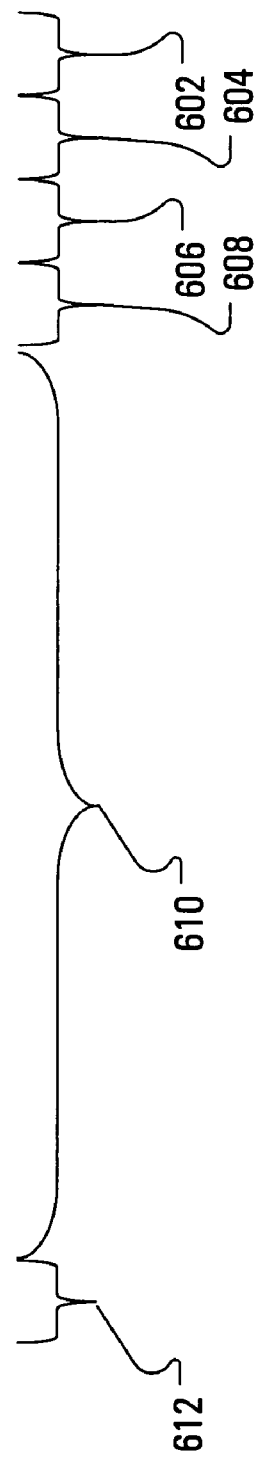
FIG. 6 illustrates a portion of a switch table specific to the exemplary moCallGroup of debugging items according to an embodiment of the present application.

FIG. 6 graphically illustrates a two-byte value 600 corresponding to the moCallGroup group defined above. In particular, the moCallGroup value 600 includes a control status bit with item name "establish" 602, a control status bit with item name "vocoerrate" 604, a control status bit with item name "chandesc" 606, a control status bit with item name "release" 608, 11 control status bits with item name "reserved" 610 for future use and a group-control status bit with item name "grpctrl", for the entire moCallGroup 612. Notably, the establish control status bit 602 and the chandesc control status bit 606 are enabled (set to 1) and the other 14 bits are disabled (set to 0).

Rather than requiring a separate debugging control command PDU to enable each control status bit in a group, the wrapping code may be arranged so that when the group-control status bit is enabled, it may be considered, in one implementation, that all of the control status bits in the group are enabled, despite the actual value of the control status bits in the group. When such an implementation is employed, the determination of whether to execute a debugging item may be slightly more complex than that presented in FIG. 4.

In one implementation, the wrapping code of objected-oriented programming (OOP) style includes a Boolean "OR" operation:

```
if ((GenericDbgObj.xxxGroup.grpctrl == 1) OR
(GenericDbgObj.xxxGroup.xxxItem == 1) OR
(GenericDbgObj.objWholeCtrl == true ){
        PRINTN("No/Bad downlink sacch received:RLTC=%2d",
            radioLinkFailCounter);
}
```

Figure 7:
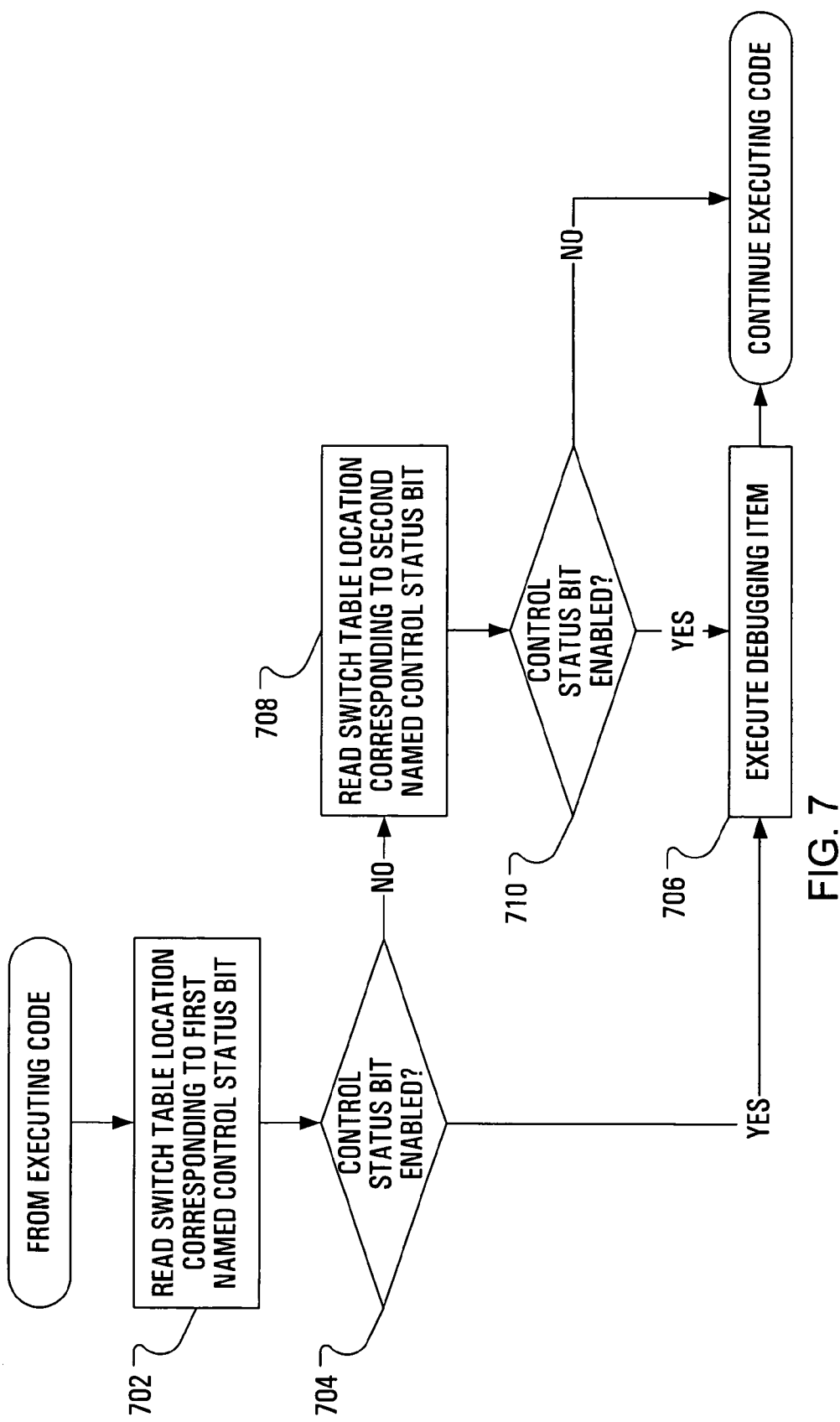
FIG. 7 illustrates steps in an exemplary method of debugging data collection according to an embodiment of the present application.

As shown in exemplary steps of a group-aware method presented in FIG. 7, while executing code, the microprocessor 228 may be caused to evaluate a conditional statement, which references two control status bits, before executing a given debugging item. In particular, the conditional statement may reference a first control status bit and a second control status bit, where the first control status bit is the group-control status bit for the group with which the second control status bit is associated. The microprocessor 228 may first read a location in the centralized client switch table database 310 (step 702) to determine the value of the first control status bit. In an exemplary case, if it is determined (step 704) that the first control status bit is enabled, the given debugging item may be executed (step 706). If it is determined (step 704) that the first control status bit is disabled, the microprocessor 228 may read a location in the centralized client switch table database 310 (step 708) to determine the value of the second control status bit. In an exemplary case, if it is determined (step 710) that the second control status bit is enabled, the given debugging item may be executed (step 706). If it is determined (step 710) that the second control status bit is disabled, the exemplary debugging item may not be executed.

Figure 8:
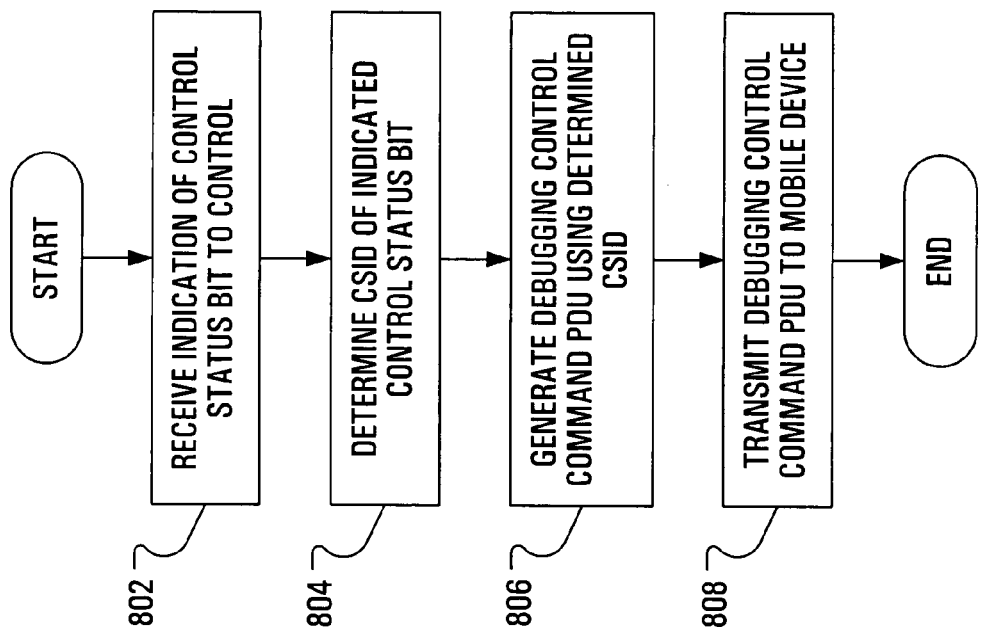
FIG. 8 illustrates steps in an exemplary method of enabling debugging data collection according to an embodiment of the present application.

From the perspective of the debug server processor 322 (see FIG. 3) in the debug server 120, exemplary steps in a method of controlling (enabling or disabling) the collection of debugging data are illustrated in FIG. 8. The method is illustrated to involve first receiving (step 802), perhaps through a user interface (not shown), an indication of a control status bit that a debugging control command PDU to be generated should control. It is expected that the user interface will present, on the display 226 to an end-user, the current value of the control status bit based on information received from the centralized server switch table database 304, so that a debugging control command PDU may only be generated for a change in the value of a control status bit. The debug server processor 322 may then determine a CSID (step 804) for a reference to the control status bit to be controlled. The debug server processor 322 may then generate a debugging control command PDU to control the control status bit (step 806), where the debugging control command PDU includes a control command and the determined CSID associated with the control status bit upon which the control command should act. The debug server processor 322 may then transmit (step 808) the debugging control command PDU to the mobile device 101.

Figure 9:
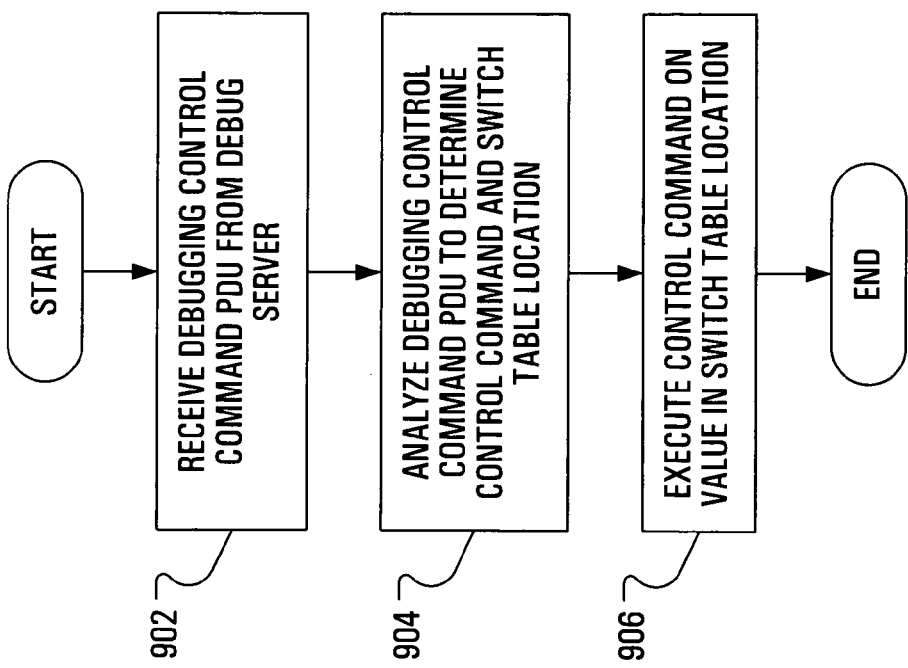
FIG. 9 illustrates the steps in an exemplary method of controlling the collection of debugging data according to an embodiment of the present application.

From the perspective of the mobile device 101, exemplary steps in a method of controlling the collection of debugging data are illustrated in FIG. 9. The method is illustrated to involve first receiving (step 902) the debugging control command PDU from the debug server 120. The mobile device 101, specifically, the microprocessor 228, may then analyze (step 904) the debugging control command PDU to determine the nature (e.g., enable, disable) of the control command and a location in the centralized client switch table database 310. The location may be determined using the CSID specified by the debugging control command PDU. Finally, the mobile device 101 may execute the control command (step 906) on the value in the determined location. That is, the microprocessor 228 may enable or disable the control status bit stored in the determined location, according to the control command.

It is considered that the command and CSID portion of the debugging control command PDU may be structured according to any one of a plurality of formats. Two exemplary formats follow. The format selected may vary according to a format selected for the CSID.

The structure of the exemplary control status bit item name as presented above (GenericDbgObj.xxxGroup.xxxItem) has three parts: object; group; and item. Correspondingly, the format selected for the CSID may have bits related to the three parts. Where the CSID is a 16-bit value, the CSID may have the format "oogg gggg gggG iiii" wherein the first two bits are used to designate a particular object, the next nine bits are used to designate a particular group, the next bit is used to designate a group-control status bit and the final four bits are used to designate a particular control status bit. As will be appreciated by those skilled in the art, other formats may be defined for the CSID, where the CSID is a 16-bit value. It is expected that, without regard for the format, the CSID should at least identify a debug object, a debug group, a debug item and whether group control is to be activated, if there are perceived advantages to the other formats.

As will be understood by a person of ordinary skill in the art, the 16 bits may be allocated differently according to quantities of objects, groups and items. In the exemplary group presented hereinbefore, a group could include 15 control status bits. However, if there are more than 16 control status bits of similar attribute in a given group, there may be a requirement for one or more new "sister" groups to represent the rest of control status bits.

Where the CSID is a 32-bit value, the CSID may have the format "oooo gggg gggg gggg Giii iiii iiii iiii" wherein the first four bits are used to designate a particular object, the next 12 bits are used to designate a particular group, the next bit is used to designate a group-control status bit and the final 15 bits are used to designate one or more particular control status bits of this group. As will be appreciated by those skilled in the art, other formats may be defined for the CSID, where the CSID is a 32-bit value. It is expected that, without regard for the format, the CSID should at least identify a debug object, a debug group, a debug item and whether group control is to be activated, if there are perceived advantages to the other formats.

For example, consider the formation of a CSID for the establish control bit 602 (FIG. 6), the vocorate control status bit 604, the chandesc control status bit 606 and the release control status bit 608. It may be that the moCallGroup of which the four control status bits are a part is identified by the decimal number five and that the object of which the moCallGroup is a part is a public object and is, therefore, identified by the decimal number zero. Additionally, since the establish control bit 602 is in the position of "DEBUG ITEM 1" (see FIG. 5), the establish control bit 602 may be identified by the decimal number one. Furthermore, since the vocorate control status bit 604 is in the position of "DEBUG ITEM 2" (see FIG. 5), the vocorate control status bit 604 may be identified by the decimal number two. The chandesc control status bit 606 is in the position of "DEBUG ITEM 3", and may be identified by the decimal number three. The release control status bit 608 is in the position of "DEBUG ITEM 4", and may be identified by the decimal number four. A 16-bit CSID for each of the establish control bit 602, the vocorate control status bit 604, the chandesc control status bit 606 and the release control status bit 608 may be formed as follows:

(0, 5, 0, 1)=00 000000101 0 0001=0x00A1 (identifying a single debug item)

(0, 5, 0, 2)=00 000000101 0 0010=0x00A2

(0, 5, 0, 3)=00 000000101 0 0011=0x00A3

(0, 5, 0, 4)=00 000000101 0 0100=0x00A4

A 16-bit CSID for the moCallGroup group-control status bit 612 may be formed as follows:

(0, 5, 1, 0)=00 000000101 1 0000=0x00B0 (identifying a single debug group)

A 16-bit CSID for the public object (public debug sub-table 332), which is identified as decimal zero, and the private object, which is identified as decimal number one, may be formed as follows:

(0, 0, 0, 0)=00 000000000 0 0000=0x0000 (the public debug sub-table 332)

(1, 0, 0, 0)=01 000000000 0 0000=0x40 00 (the private debug sub-table 334)

In a 32-bit CSID, more than one control status bit may be referenced. Rather than referring to a control status bit by a number, the 15 bits used to identify the control status bits may mimic the structure of the 15 control status bits 502 in a two-byte group representation 500 (FIG. 5). As such, the vocorate control status bit 604 and the chandesc control status bit 606 may be identified in 15-bits as 000000000000110. A 32-bit CSID for the vocorate and chandesc control status bits 604, 606 may be formed as follows:

(0, 5, 0, x)=0000 000000000101 0 000000000000110=0x00 05 00 06

("x" includes a reference to two control status bits in this example)

Similarly in a 32-bit CSID, combinations of one, two, three or four control status bits (FIG. 6), and the whole object may be formed as follows:

To select a single control status bit:
(0, 5, 0, 1)=0000 000000000101 0 000000000000001=0x00 05 00 01
(0, 5, 0, 2)=0000 000000000101 0 000000000000010=0x00 05 00 02
(0, 5, 0, 3)=0000 000000000101 0 000000000000100=0x00 05 00 04
(0, 5, 0, 4)=0000 000000000101 0 000000000001000=0x00 05 00 08

To select a combination of two control status bits:
(0, 5, 0, --++)=0000 000000000101 0 000000000000011=0x00 05 00 03
(0, 5, 0, -++-)=0000 000000000101 0 000000000000110=0x00 05 00 06
(0, 5, 0, ++--)=0000 000000000101 0 000000000001100=0x00 05 00 0C
(0, 5, 0, +--+)=0000 000000000101 0 000000000001001=0x00 05 00 09
(0, 5, 0, -+-+)=0000 000000000101 0 000000000000101=0x00 05 00 05
(0, 5, 0, +-+-)=0000 000000000101 0 000000000001010=0x00 05 00 0A To select a combination of three control status bits:
(0, 5, 0, -+++)=0000 000000000101 0 000000000000111=0x00 05 00 07
(0, 5, 0, +-++)=0000 000000000101 0 000000000001011=0x00 05 00 0B
(0, 5, 0, +++-)=0000 000000000101 0 000000000001110=0x00 05 00 0E
(0, 5, 0, ++-+)=0000 000000000101 0 000000000001101=0x00 05 00 0D To select a combination of four control status bits:
(0, 5, 0, ++++)=0000 000000000101 0 000000000001111=0x00 05 00 0F To select the whole group:
(0, 5, 1, 0)=0000 000000000101 1 000000000000000=0x00 05 80 00

To select the whole public object (public sub-table):
(0, 0, 0, 0)=0000 000000000000 0 000000000000000=0x00 00 00 00

To select the whole private object (private sub-table):
(1, 0, 0, 0)=0001 000000000000 0 000000000000000=0x10 00 00 00

As for the number of operation commands on these debugging items, groups and objects, one octet is considered by the applicant to be long enough to define a sufficient number of kinds of possible operations, though two or more octets may be used for other reasons. Such other reasons may include PDU length alignment. An operation command to "Enable" a control status bit (i.e., "activate" a corresponding debugging item) may be assigned a hexadecimal value of 0x11 while an operation command to "Disable" a control status bit (i.e., "deactivate" a corresponding debugging item) may be assigned a hexadecimal value of 0x21. An operation command to "Demand" the contents of the circular runtime troubleshooting buffer 314 from the mobile device 101 may be assigned a hexadecimal value of 0x31. Others values, which may even be of different length, may be used for these exemplary operation commands, so long as each different operation command has a unique value so that the operation commands may be differentiated from each other.

Furthermore, other operation commands may be defined for different purposes, for instance, to change the size of the circular runtime troubleshooting buffer 314, to change the frequency (the period length) with which the contents of the circular runtime troubleshooting buffer 314 are reported to the debug server 120, to reconfigure the events that trigger the reporting of the contents of the circular runtime troubleshooting buffer 314, etc.).

At some point, a new operation command may be added to the set of operation commands available to be transmitted by the debug server 120 to mobile devices. The new operation command may be added by way of a debug server software update. A corresponding mobile device software update may also be prepared for the mobile device 101 (and other mobile devices) so that the mobile device 101 will correctly interpret the new operation command, when received from the debug server 120. As will be clear to a person of ordinary skill in the art, a unique value should be associated with the new operation command to maintain compatibility with mobile devices that have not yet received the mobile device software update. In this way, the new operation command added at the debug server 120 will be interpreted correctly on mobile devices that have received the mobile device software update, yet will not trigger unintended action to be taken by mobile devices that have not yet received the mobile device software update.

A debugging control command PDU to enable the vocorate control status bit 604 may be generated with a command and CSID portion as follows:

0x11 00 A2

Similarly, debugging control command PDUs to enable multiple (two, three or four) control status bits, public object and private object may be respectively generated with a command and CSID portion as follows:

| | | | | |
|---|---|---|---|---|
| 0x11 00 A1 | 0x11 00 A2 | | | (multiple = 2) |
| 0x11 00 A1 | 0x11 00 A2 | 0x11 00 A3 | | (multiple = 3) |
| 0x11 00 A2 | 0x11 00 A2 | 0x11 00 A3 | 0x11 00 A4 | (multiple = 4) |
| 0x11 00 00 | | | | (public object) |
| 0x11 00 B0 | | | | (private object) |

A debugging control command PDU to disable the chandesc control status bit 606 may be generated with the command and CSID portion as follows:

0x21 00 A3

Similarly, debugging control command PDUs to disable multiple (two, three or four) status bits, a public object or a private object may be respectively generated to have length-variable octets in the command and CSID portion as follows:

| | | | | |
|---|---|---|---|---|
| 0x21 00 A1 | 0x21 00 A2 | | | (multiple = 2) |
| 0x21 00 A1 | 0x21 00 A2 | 0x21 00 A3 | | (multiple = 3) |
| 0x21 00 A2 | 0x21 00 A2 | 0x21 00 A3 | 0x21 00 A4 | (multiple = 4) |
| 0x21 00 00 | | | | (public object) |
| 0x21 00 B0 | | | | (private object) |

Debugging control command PDUs to demand the contents of the circular runtime troubleshooting buffer 314 from the mobile device 101 may be generated with the command and CSID portion as follows:

0x31 00 00 (demand the log from public debug items or object)

0x31 00 B0 (demand the log from private debug items or object)

If the same command is to be performed on more than one control status bit in a group, the 32-bit CSID may be found to be advantageous. A debugging control command PDU to enable the vocorate control status bit 604 and the chandesc control status bit 606 may be generated with the command and CSID portion as follows:

0x11 00 05 00 06

Similarly, debugging control command PDUs to enable a single status bit, multiple (three or four) status bits, a public object or a private object may be generated to have a consistent number of octets in the command and CSID portion as follows:

0x11 00 05 00 01 (single)
0x11 00 05 00 07 (multiple=3)
0x11 00 05 00 0F (multiple=4)
0x11 00 00 00 00 (public object)
0x11 10 00 00 00 (private object)

By replacing "0x11" with "0x21" in the command portion of each of the five preceding exemplary debugging control command PDUs, corresponding debugging control command PDUs may be generated to disable the control status bits identified by the 32-bit CSIDs.

The command and CSID portion of debugging control command PDUs to demand the contents (a log) of the circular runtime troubleshooting buffer 314 from the mobile device 101 may be generated as follows:

0x31 00 00 00 00 (demand the log from public debug items or object)

0x31 10 00 00 00 (demand the log from private debug items or object)

The debugging control command PDU, once generated, may be transmitted to the mobile device 101 (step 808) using the User Datagram Protocol/Internet Protocol (UDP/IP) or the Transport Control Protocol/Internet Protocol (TCP/IP) over one of a variety of wireless data transportation mechanisms. Exemplary wireless data transportation mechanisms include GPRS, which is associated with GSM networks, and 1xRTT, which is associated with CDMA networks. In particular, the debugging control command PDU may be transmitted as a TCP payload, after a standard 20-byte header and an indicator that the payload is a debugging control command PDU. The indicator may be a predetermined string, such as "OTADEBUG", or a special cookie ID, such as "0x88 66 AA 55". Alternatively, the debugging control command PDU may be transmitted as a UDP payload, after a standard 8-byte header and an indicator that the payload is a debugging control command PDU.

It is considered that server-to-mobile addressing is outside the scope of this application, as any suitable end-to-end system may be selected by the person of ordinary skill in the art based, perhaps in part, on the selected wireless data transportation mechanism and the protocol selected for the debugging control command PDUs.

Advantageously, the use of a CSID may be considered to serve to de-couple the reference to a control status bit from the name of the control status bit. Control status bit names may vary from model to model among the wireless communication devices of one manufacturer. Additionally, control status bit names may vary based on wireless transportation mechanism, e.g., GSM/GPRS, CDMA 1xRTT, WiFi (IEEE 802.11), Universal Mobile Telecommunications System (UMTS), CDMA 1xEV-DV, Integrated Digital Enhanced Network (iDEN).

Advantageously, the use of the centralized switch table databases 304, 310 to reference debugging items allows the command generating application 302 executed on the debug server processor 322 to remain static. As a new debugging item is added to a given mobile device and a reference to the new debugging item is added to the centralized client switch table database 310, the reference to the new debugging item may also be added to the centralized server switch table database 304 that corresponds to the given mobile device at the debug server 120.

A user interface may be made available on the mobile device 101 itself to enable or disable debugging items and manage a log generated by those debugging items wrapped with conditional statements referencing control status bits that have been enabled. A user interface presented by the mobile device 101 may access the centralized client switch table database 310 to indicate which of the control status bits are currently enabled, and are candidates for disabling, and which of the control status bits are currently disabled, and are candidates for enabling. The managing of the log may involve displaying the log on the display 226 or sending the log, via the end-to-end network connection 306, to the debug server 120 for analysis.

Rather than connecting to the mobile device 101 over the end-to-end network connection 306, the debug server 120 may connect to the mobile device 101 directly using a direct serial connection or Universal Serial Bus connection that may be grouped among the set of auxiliary I/O devices 206 on the mobile device 101. Alternatively, a connection between the mobile device 101 and the debug server 120 may be made using the short-range communications subsystem 202.

Although aspects of the application have been described above primarily as the debug server 120 controlling debugging on a single mobile device 101, aspects of the application may be applied across a large number of similarly configured mobile devices at the same time. In such an application, the debug server 120 may, for instance, enable a given control status bit on each of a plurality of mobile devices such that a particular aspect of the operation of the mobile devices is recorded in a plurality of corresponding logs of output generated by debugging items wrapped by conditional code referencing the given control status bit. At the debug server 120, the plurality of corresponding logs may be received and then analyzed by the server log analyzing application 318 executed on the debug server processor 322. In this way, IOT specialists may consider the interaction of a plurality of devices with the same network and address specific issues such as call drop frequency, voice quality and extent of network coverage.

Advantageously, from the standpoint of IOT specialists, existing code may be straightforwardly modified to employ aspects of the application. That is, existing code without any debugging items, e.g., a commercial build, may be revised to include debugging items and corresponding wrapping code that references control status bits. Alternatively, existing code with debugging items, e.g., a beta build or an engineering build, may be revised to include wrapping code that references control status bits. The revised beta build or engineering build may then be considered, with the control status bits initially disabled, to approximate a commercial build.

Other modifications will be apparent to those skilled in the art and, therefore, the invention is defined in the claims.

We claim:

1. A mobile communication device, comprising:
    a computer readable medium storing a client database comprising a client public debug sub-table and a client private debug sub-table, said public debug sub-table comprising debugging items and control status indicator pairs and said private debug sub-table comprising private debugging items and control status indicator pairs; and
    a processor operable to:
        activate a given private debugging item on receipt of a first command, said first command including an identifier of said given private debugging item and a control command to enable execution of said given private debugging item, said given private debugging item activatable only where said first command is generated by an application executing on said mobile communication device or is received from a computing device locally connected to said mobile communication device, at least absent a command from an end-user of said mobile communications device through a user interface; and
        activate a given public debugging item on receipt of a second command, said second command including an identifier of said given public debugging item and a control command to enable execution of said given public debugging item, said given public debugging item activatable where said second command is generated by an application executing on said mobile communication device, is received from a computing device locally connected to said mobile communication device, or is received from a remote debug server.

2. The mobile communication device of claim 1 wherein said processor of said mobile communications device is further operable to: on receipt of a third command to activate a particular private debugging item from said remote debug server, present to an end-user through said user interface an indication to accept said third command to enable execution of said particular private debugging item.

3. The mobile communication device of claim 1 wherein said processor of said mobile communications device is further operable to:
    on receipt of said first command, parse said first command for said identifier, and modifying a client database control status indicator for a debugging item in accordance with said identifier and said control command; and
    while executing software code containing public and private debugging items, execute a given public or private debugging item only if said control status indicator in said client database for said given debugging item is enabled.

4. The mobile communication device of claim 1 wherein said processor of said mobile communications device is further operable to:
    on receipt of said second command, parse said second command for said identifier, and modifying a client database control status indicator for a debugging item in accordance with said identifier and said control command; and
    while executing software code containing public and private debugging items, execute a given public or private debugging item only if said control status indicator in said client database for said given debugging item is enabled.

5. A method of controlling conditional execution of debugging items wrapped in software code executing at a mobile communication device, said method comprising:
    at said mobile communication device,
        storing a client database comprising a client public debug sub-table and a client private debug sub-table, said public debug sub-table comprising public debugging items and control status indicator pairs and said private debug sub-table comprising private debugging items and control status indicator pairs;
        activating a given private debugging item on receipt of a first command, said first command including an identifier of said given private debugging item and a control command to enable execution of said given private debugging item, said given private debugging item activatable only where said first command is generated by an application executing on said mobile communication device or is received from a computing device locally connected to said mobile communication device, at least absent a command from an end-user of said mobile communications device through a user interface; and
        activating a given public debugging item on receipt of a second command, said second command including an identifier of said given public debugging item and a control command to enable execution of said given public debugging item, said given public debugging item activatable where said second command is generated by an application executing on said mobile communication device, is received from a computing device locally connected to said mobile communication device, or is received from a remote debug server.

6. The method of claim 5 further comprising capturing data generated during execution of said given private debugging item and said given public debugging item in a buffer at said mobile communication device and transmitting the contents of said buffer to said debug server.

7. The method of claim 5 further comprising:
    at said mobile communication device:
        on receipt of said first command, parsing said first command for said identifier, and modifying a client database control status indicator for a debugging item in accordance with said identifier and said control command; and
        while executing said software code, executing a given public or private debugging item only if said control status indicator in said client database for said given debugging item is enabled.

8. The method of claim 5 further comprising:
at said mobile communication device:
- on receipt of said second command, parsing said second command for said identifier, and modifying a client database control status indicator for a debugging item in accordance with said identifier and said control command; and
- while executing said software code, executing a given public or private debugging item only if said control status indicator in said client database for said given debugging item is enabled.

9. The method of claim 5 further comprising:
on receipt of a third command to activate a particular private debugging item from said remote debug server, presenting to an end-user through said user interface an indication to accept said third command to enable execution of said particular private debugging item.

10. The method of claim 5 wherein said storing a client public debug sub-table comprising public debugging items further comprises storing debugging items related to at least one of power consumption data, deadlock, and LCD reset.

11. The method of claim 5 wherein said storing a client private debug sub-table comprising private debugging items further comprises storing debugging items related to at least one of location information, caller phone number, and called phone number.

* * * * *

UNITED STATES PATENT AND TRADEMARK OFFICE
CERTIFICATE OF CORRECTION

PATENT NO. : 7,559,055 B2
APPLICATION NO. : 11/152165
DATED : July 7, 2009
INVENTOR(S) : Lianghua Yang et al.

It is certified that error appears in the above-identified patent and that said Letters Patent is hereby corrected as shown below:

Column 19,
Line 24, "comprising debugging items" should be changed to --comprising public debugging items--;
Line 34, "first command is" should be changed to --first command (i) is--;
Line 36, "device or is" should be changed to --device, (ii) is--;
Lines 38 to 39, delete "at least absent a command from an end-user" and insert --or (iii) is received from a computing device not locally connected to said mobile communication device and an indication accepting said first command is received through a user interface--;
Line 39, delete "communications" and insert --communication--;
Line 40, delete "through a user interface";
Line 46, after "second command" insert --(i)--;
Line 48, after "communication device," insert --(ii)--;
Line 50, after "tion device, or" insert --(iii)--;
Lines 53 to 54, delete "on receipt of a third command to activate a particular private debugging item" and insert --where said first command is received--;
Line 56, "said third command" should be changed to --said first command--; and
Line 63, "for a debugging" should be changed to --for a private debugging--.

Column 20,
Line 9, "for a debugging" should be changed to --for a public debugging--;
Line 32, "first command is" should be changed to --first command (i) is--;
Line 34, "device or is" should be changed to --device, (ii) is--;
Lines 36 to 37, delete "at least absent a command from an end-user" and insert --or (iii) is received from a computing device not locally connected to said mobile communication device and an indication accepting said first command is received through a user interface--;
Line 37, delete "communications" and insert --communication--;
Line 38, delete "through a user interface";
Line 44, after "second command" insert --(i)--;
Line 46, after "communication device," insert --(ii)--;
Line 48, after "tion device, or" insert --(iii)--; and
Line 58, "for a debugging" should be changed to --for a private debugging--.

UNITED STATES PATENT AND TRADEMARK OFFICE
CERTIFICATE OF CORRECTION

PATENT NO. : 7,559,055 B2
APPLICATION NO. : 11/152165
DATED : July 7, 2009
INVENTOR(S) : Lianghua Yang et al.

It is certified that error appears in the above-identified patent and that said Letters Patent is hereby corrected as shown below:

Column 21,
Line 5, "for a debugging" should be changed to --for a public debugging--; and
Lines 13 to 14, delete "on receipt of a third command to activate a particular private debugging item" and insert --where said first command is received--.

Column 22,
Line 2, "said third command" should be changed to --said first command--.

Signed and Sealed this

Fifteenth Day of December, 2009

David J. Kappos
*Director of the United States Patent and Trademark Office*